(12) United States Patent
Vickers et al.

(10) Patent No.: US 9,393,833 B2
(45) Date of Patent: Jul. 19, 2016

(54) ASSEMBLY FOR VEHICLE

(75) Inventors: Christopher Vickers, Cheshire (GB); Mark Phillips, West Midlands (GB); Martin R. Peel, Cheshire (GB)

(73) Assignee: BENTLEY MOTORS LIMITED, Crewe Cheshire (GB)

( * ) Notice: Subject to any disclaimer, the term of this patent is extended or adjusted under 35 U.S.C. 154(b) by 192 days.

(21) Appl. No.: 14/128,838

(22) PCT Filed: Jun. 29, 2012

(86) PCT No.: PCT/GB2012/051520
§ 371 (c)(1),
(2), (4) Date: Dec. 23, 2013

(87) PCT Pub. No.: WO2013/005008
PCT Pub. Date: Jan. 10, 2013

(65) Prior Publication Data
US 2014/0152079 A1    Jun. 5, 2014

(30) Foreign Application Priority Data
Jul. 1, 2011    (GB) .................................. 1111251.3

(51) Int. Cl.
*B60B 7/04*    (2006.01)
*B60B 7/06*    (2006.01)
*B60B 7/08*    (2006.01)

(52) U.S. Cl.
CPC . *B60B 7/06* (2013.01); *B60B 7/066* (2013.01); *B60B 7/08* (2013.01)

(58) Field of Classification Search
CPC ............ B60B 7/04; B60B 7/061; B60B 7/063
USPC ........... 301/37.27, 37.42, 37.43, 37.26, 37.32
See application file for complete search history.

(56) References Cited

U.S. PATENT DOCUMENTS

| 4,040,672 A | * | 8/1977 | Imahashi | B60B 7/14 220/233 |
| 4,067,621 A | * | 1/1978 | Reppert | B60B 7/00 301/108.3 |
| 4,818,032 A | * | 4/1989 | Thomas | B60B 7/16 301/108.1 |

(Continued)

FOREIGN PATENT DOCUMENTS

| DE | 8534757 | 1/1986 |
| DE | 3532991 A1 | 3/1987 |

(Continued)

*Primary Examiner* — Jeffrey J Restifo
(74) *Attorney, Agent, or Firm* — Barlow, Josephs & Holmes, Ltd.

(57) ABSTRACT

A vehicle trim assembly for mounting directly or indirectly to a vehicle wheel has a center cap, a locking member, and a cap badge. The locking member is mounted on the center cap, whereby a number of projecting portions provided on the locking member engage with a corresponding number of resilient catches provided on the center cap. The locking member is rotatable between a lock and an unlock position. In the lock position, separation of the center cap from the vehicle wheel is prevented by the locking member. When the cap badge is fitted to the assembly, features on the rear face of the cap badge engage with corresponding cooperating features on the center cap and the locking member, thereby preventing the locking member from moving relative to the center cap. An interference locking arrangement prevents the locking member from accidentally rotating from a lock to an unlock position.

24 Claims, 5 Drawing Sheets

(56) References Cited

U.S. PATENT DOCUMENTS

| | | | | |
|---|---|---|---|---|
| 4,986,606 A * | 1/1991 | Thomas | | B60B 7/16 301/108.1 |
| 5,443,582 A * | 8/1995 | Ching | | B60B 7/14 301/37.26 |
| 5,845,972 A | 12/1998 | Baker | | |
| 6,402,254 B1 * | 6/2002 | Eikhoff | | B60B 7/0013 301/37.31 |
| 6,457,781 B1 * | 10/2002 | Cutcher | | B60B 1/06 301/37.371 |
| 6,969,124 B2 * | 11/2005 | Gerard | | B60B 7/0013 301/108.1 |
| 6,978,544 B1 | 12/2005 | Eikhoff et al. | | |
| 7,416,260 B1 * | 8/2008 | Cuevas | | B60B 7/08 301/37.106 |
| 7,651,171 B2 * | 1/2010 | Kinslow | | B60B 7/10 301/108.1 |
| 7,669,940 B2 * | 3/2010 | Diko | | B60B 7/14 301/37.106 |
| 7,775,604 B2 | 8/2010 | Chen | | |
| 8,851,577 B2 * | 10/2014 | Onishi | | B60B 7/08 301/108.1 |
| 2006/0279135 A1 * | 12/2006 | Sabanes | | B60B 7/08 301/37.374 |
| 2007/0228807 A1 * | 10/2007 | Leslie | | B60B 7/0013 301/37.26 |
| 2010/0194181 A1 * | 8/2010 | Noriega | | B60B 1/06 301/37.26 |
| 2011/0006589 A1 * | 1/2011 | McCorry | | B60B 7/08 301/37.43 |
| 2011/0291465 A1 * | 12/2011 | Peschiutta | | B60B 7/006 301/37.102 |
| 2012/0319459 A1 * | 12/2012 | Salah | | B60B 7/04 301/37.25 |
| 2013/0069422 A1 * | 3/2013 | Li | | B60B 1/06 301/104 |
| 2014/0152078 A1 * | 6/2014 | Noriega | | B60B 1/06 301/37.26 |
| 2014/0346845 A1 * | 11/2014 | Renner | | B60B 3/004 301/37.42 |
| 2015/0069821 A1 * | 3/2015 | Bennett | | B60B 7/0013 301/37.26 |

FOREIGN PATENT DOCUMENTS

| | | |
|---|---|---|
| DE | 19826060 A1 | 12/1999 |
| DE | 10318407 A1 | 11/2004 |
| FR | 2470836 | 6/1981 |
| FR | 2734206 A1 | 11/1996 |
| GB | 2291017 A | 1/1996 |
| GB | 2369605 A | 6/2002 |
| WO | 2006101788 A1 | 9/2006 |

* cited by examiner

ASSEMBLY FOR VEHICLE

TECHNICAL FIELD THE INVENTION

The present invention relates to an assembly for a vehicle, in particular to a vehicle trim assembly intended for mounting on a vehicle, especially a road vehicle, wheel.

BACKGROUND TO THE INVENTION

Modern vehicles comprise a plurality of components which do not form part of the structural part of the vehicle itself. In particular, vehicles may have trim components fitted, either to improve the aesthetic characteristics of the vehicle, to reduce noise and/or drag, or to improve certain other characteristics of the vehicle and its handling.

As they are commonly attached to the outside of a vehicle, trim components are subject to a number of forces and conditions when the vehicle is in operation, such as turning manoeuvres, high vehicle travelling speeds, or high rotational speeds (if for example said trim component is fitted to a wheel of the vehicle), and are therefore prone to detach from the vehicle. This reduces the aesthetic appeal of a vehicle, and may even adversely affect performance of the vehicle.

Dislodgment and detachment of trim components may occur as a result of the components being fitted incorrectly, or may be due to the component fittings not being suitable for retaining the component to the vehicle.

Existing vehicle trim components commonly rely on resilient catches to keep the component attached to the vehicle, in particular its wheels. However, when external forces are applied to the trim components, such catches have a tendency to come undone. A common solution is to increase the force necessary to remove a trim component from the vehicle. This however greatly increases the difficulty in removing the component for maintenance, for example to change a wheel.

The present invention seeks to address the above problems.

SUMMARY OF THE INVENTION

According to a first aspect of the invention, there is provided an assembly comprising a trim component intended to be mounted directly or indirectly on the wheel of a vehicle, the trim component having at least one resilient catch and intended to be mounted on a second component and retained relative to the second component by way of the at least one resilient catch, and a locking member operable between unlocked and locked positions and arranged such that when in the locked position it prevents movement of the at least one resilient catch in a release direction, and thereby prevents the component from being separated from the second component.

The second component may be a vehicle wheel. The trim component may be, or the assembly may otherwise comprise, a hub cap or wheel cap badge.

The at least one resilient catch may have any suitable shape for engagement with the second component, and may comprise formations or features that improve retention of the component through any suitable means. The resilient catch may be a snap fitting, or it could be a movable fitting associated with a resilient member such as a spring. The resilient catch may be a resiliently biased catch.

The component may have any suitable number of resilient catches provided on one or several surfaces thereof. The catches may be arranged in any suitable configuration. The resilient catches may be arranged in a symmetrical configuration, for example a circular configuration.

The locking member may have any suitable shape for preventing movement of the resilient catch in a release direction. The locking member may comprise one or several engagement means for engagement with the component and/or resilient catch(es). Said engagement means may be provided on the surface of said locking member, and may be in a configuration adapted to engage with the component and/or the resilient catch(es). In one embodiment, the engagement means may comprise radial projections arranged circumferentially on the surface of the locking member, the outside surface of each said projection comprising a surface adapted to engage with the or each component. The radial projections may be arranged to engage with respective resilient catches of the component.

Said engagement means may comprise suitable engageable formations or other features, so as to improve retention of said catch(es) when said locking member is in a locked position. Said formations or features may be provided on any or all of said engagement means. In one embodiment, said engageable formations or features may be adapted so as to facilitate the locking and unlocking movement of the locking member. Said engageable formations or features may comprise a ridge, a plurality of ridges or other features.

The resilient catch may comprise cooperating formations or features corresponding to the engageable formations or features provided on the engagement means for engagement therewith during any or all of the unlocking and locking movements, or when said locking member is in a completely locked or unlocked position. Said cooperating formations or features may be shaped so as to conform to the shape of the engageable formations or features provided on the engagement means. In one embodiment, said cooperating formations or features may comprise a groove provided on the at least one resilient catch.

The engageable formations and corresponding cooperating formations may have any suitable orientation relative to the direction of the locking and unlocking movement. In one embodiment, the engageable formations and cooperating formations are substantially parallel to the locking and unlocking movement directions and perpendicular to a central axis of the component.

In one embodiment, the engagement means of the locking member and the or each resilient catch comprise respective cooperating formations which cooperate when the locking member is in the locked position, so as to resist movement of the locking member from the locked to the unlocked position.

The locking and unlocking movement, during which the locking member is moved between a locked and an unlocked position, may be any suitable therefor, including but not limited to a rotation concentric with a central axis of the component, a rotation around an arbitrary axis, or a linear movement. In one embodiment, the locking and unlocking movement is a rotation around and concentric with a central axis of the component.

In one embodiment, the assembly may be fitted with a second locking member to prevent the locking member from accidentally performing an unlock movement. The second locking member may have any suitable shape therefor. The second locking member may, when fitted, engage with one or both of the component and the locking member, and may comprise suitable engagement features or formations on a surface thereof. In one embodiment, one or both of the component and the locking member comprise reception or cooperating features or formations for engagement with the engagement features or formations of the second locking member. In one embodiment, the second locking member may be a cap fitted to and arranged concentric with one or both of the component and the locking member. The second locking member may be arranged to prevent relative movement between the component and the locking member.

In one arrangement, the assembly may have an interference locking arrangement provided thereon. Said interference locking arrangement may comprise a lead-in and a lead-out portion provided on a suitable surface of one of the locking member or the component. The lead-in portion may be adapted so as to urge the locking member away from a locked position and the lead-out portion may correspondingly be adapted so as to urge the locking member towards a locked position. The lead-in and lead-out portions may form a continuous surface. In one embodiment, said lead-in and lead-out portions are formed on one or all of the engagement means of the locking member. In an alternative embodiment the lead-in and lead-out portions may be provided proximal or distant to the engagement means.

Said interference locking arrangement may comprise a stop, such as a notch, which may be provided in any suitable position for arresting the locking movement of the locking member. In one embodiment, said stop is provided adjacent to said lead-in and lead-out portions. The stop may be adapted so as to conform to the shape of the resilient catch when the locking member is in a locked position.

The component may be adapted so as to have decorative elements or features attached thereto, such as badges, caps, other trim components, or similar. The component may further be provided with decorative features, such as embossed letters or numbers, stickers, or similar.

In one embodiment of the invention, the assembly is a vehicle trim assembly, in particular a center cap assembly for a vehicle wheel, comprising a center cap, a decorative cap, and a locking member. In this embodiment said center cap comprises one or several resilient catches, and said locking member comprises a corresponding number of engagement means for engagement with the or each catch.

DETAILED DESCRIPTION OF THE INVENTION

In order that the invention may be more clearly understood an embodiment thereof will now be described, by way of example only, with reference to the accompanying drawings, of which:

Figure 1:
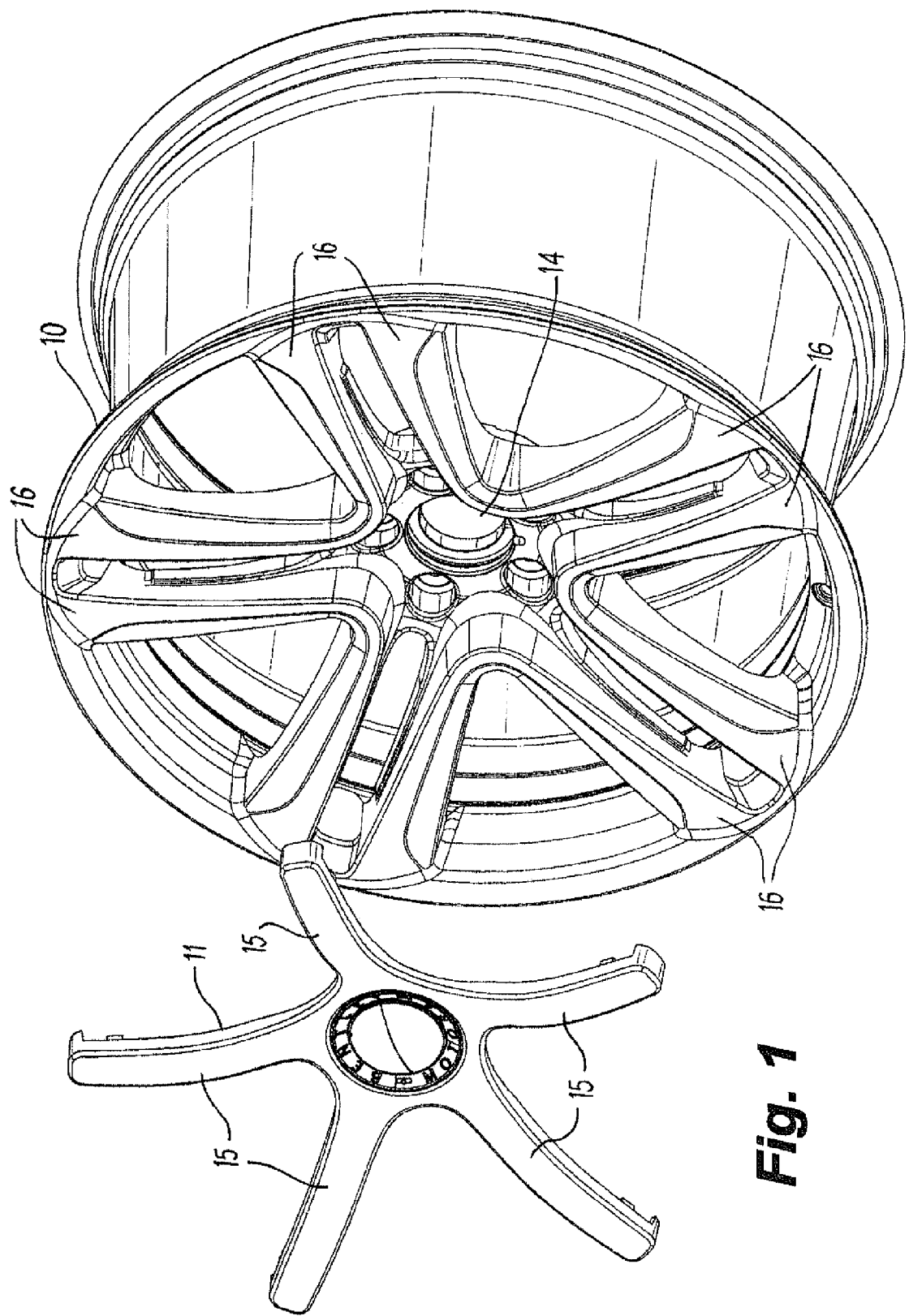
FIG. 1 is a perspective view of a vehicle wheel and an associated trim component fitted with an assembly according to the present invention.
Figure 7:
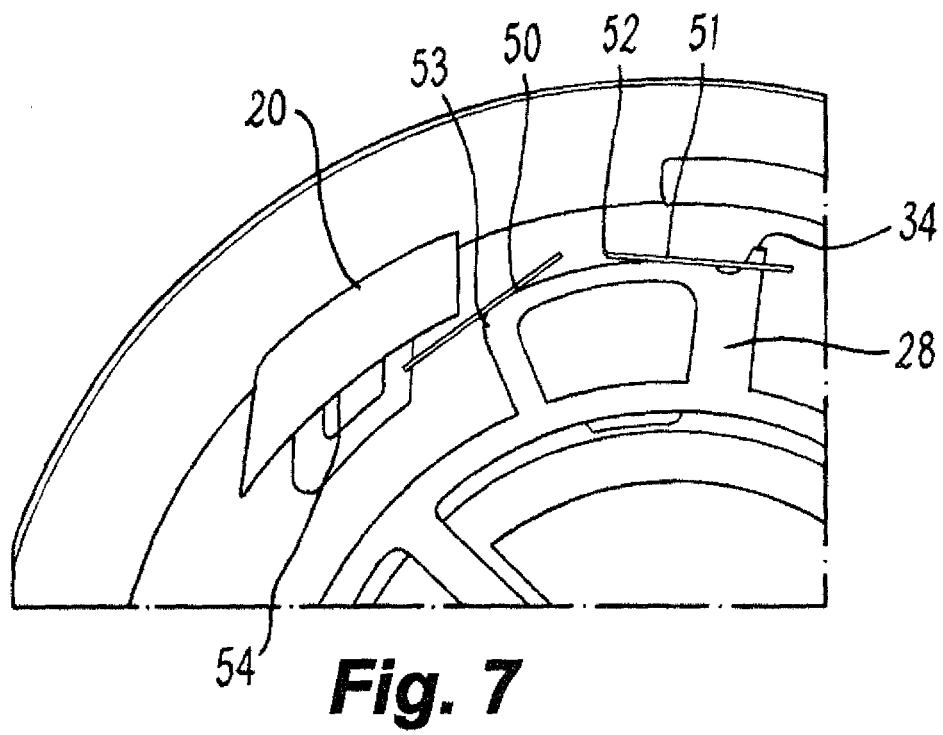
Figure 8:
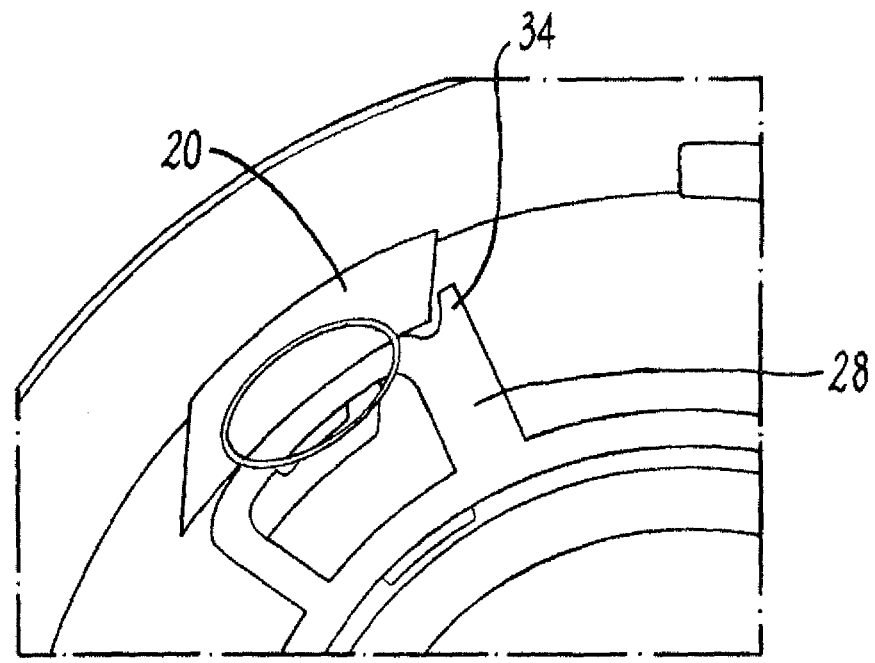

FIGS. 5 a-b are a reverse head-on view and a reverse perspective view of the cap badge;

FIGS. 6 a-c are perspective views of the assembly of FIG. 1 being assembled and fitted to a wheel trim component;

FIG. 7 is a perspective view of the locking arrangement between the resilient catch and the locking member of another embodiment of an assembly according to the invention; and FIG. 8 is the same as FIG. 7, but in a locked state.

Figure 2:
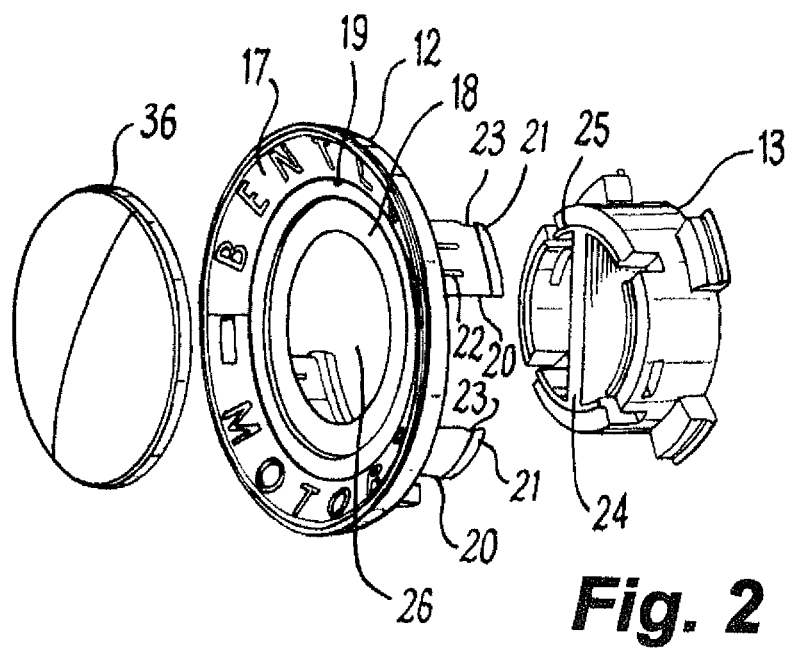
FIG. 2 is an exploded perspective view of the assembly of FIG. 1.
Figure 3:
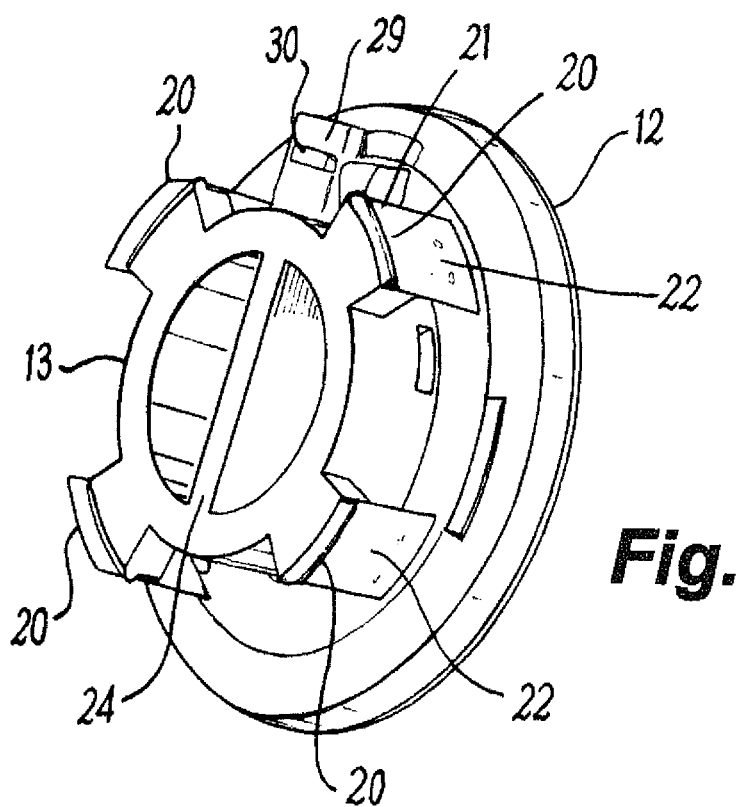
FIG. 3 is a reverse perspective view of the assembly of FIG. 2 in an assembled state.

Referring to FIGS. 1-3, an automobile wheel 10 is fitted with a decorative trim component 11. The decorative trim component is fastened to the wheel by way of a center cap 12 locked in position by a locking means. A cap badge 13 is fitted over the center cap.

The automobile wheel is conventional in nature, save that it has a central substantially circular aperture 14 for receiving the center cap 12. The circumferential wall of the aperture 14 includes a circumferential slot 14a. In the present example the wheel is formed from a lightweight alloy and has pairs of spokes 16 connecting a center portion which defines the circular aperture 14 to a rim. It could, however take any suitable form.

The components of the assembly, as well as the trim component, are moulded from a resilient plastics material with material properties such that the major parts of the components are substantially rigid whilst patches, tabs, and other similar features, are resiliently movable when force is imparted thereon. The patch or tab will return to its original position when this force is removed.

The trim component 11 has a center, defining a substantially circular recess within which is formed a substantially circular aperture of smaller diameter corresponding substantially to the diameter of the central aperture 14 in the wheel, from which a plurality of evenly spaced arms 15 extend in a radial fashion. The number of arms, in this case five, corresponds to the number of pairs of spokes 16 of the wheel. When the trim component 11 is fitted to the wheel the arms fit between respective pairs of spokes to enhance the appearance of the wheel. The plastics material from which the trim component is formed has a similar appearance to the alloy of the wheel so that the trim component appears to be part of the wheel. Since the plastics material is of much lower density than the alloy, it gives the appearance of a more substantial wheel without significantly increasing the mass of the wheel.

The trim component 11 is mounted to the wheel by a center cap 12 which is received into the recess in the trim component and extends through the aperture in the trim component to engage with the wheel.

The center cap 12 is moulded from a plastics material and has a ring-shaped portion with an outside diameter sufficiently smaller than the inside diameter of the recess in the trim component to allow center cap to be received into the recess with a close fit. The inside diameter of the center cap is smaller than the diameter of the central aperture 14 in the wheel.

The cap has a front face which faces away from the wheel when the center cap 12 is fitted to the trim component and wheel, and a rear face which faces the trim component 11 and wheel 10. The outer circumferential part 17 of the front face of the cap is visible when the cap and cap badge are fitted to a wheel and may carry decorative material, for example the name of a manufacturer or other indicia. The surface of this portion is shaped to conform to that of the trim component. The inner circumferential part 18 of the front face of the center cap defines a substantially circular recess in the face for receiving the cap badge 36. A pair of slots 19 are formed in the center cap towards the edge of and at opposite sides respectively the recess. One slot is wider than the other slot. The slots are intended to receive tabs formed on a rear face of the cap badge, as discussed further below.

Four resilient catches 20 extend from the rear face of the center cap 12 in an axial direction. The catches are mounted in a circular configuration concentric with the central axis of the center cap. At their free end, each of said catches has a wedge shaped projection 21 extending radially outwards. When the trim component 11 is fitted to the automobile wheel, these wedge shaped projections 21 engage in the slot 14a of the wheel aperture 14 of the automobile wheel to retain the trim component thereagainst.

On the radially inside surface of each of the resilient catches 20, a snap fitting 22 is provided. Each snap fitting is intended to engage with the rear face of the trim component 11 when the center cap is fitted thereto, so as to prevent accidental dislodgment of the center cap from the trim component and so as to ensure a continuously close fit between these. On the inside surface of each of the resilient catches 20 is further provided a groove 23. Collectively, the grooves extend along the circumference of a circle which is perpendicular to and concentric with the central axis of the center cap 12.

A projection 29 extends axially from the rear face of the center cap 12. The projection has a stop 30 formed on the radially inside surface thereof at a distance from the rear face of the center cap substantially identical to the distance between the rear face of the center cap and grooves 23. The projection 29 is disposed between two of the catches 20 and closer to one of those catches than the other.

A locking member 13 is intended to be fitted to the center cap 12 and to act as a locking means to prevent the accidental dislodgment or removal of the center cap, and hence the trim component 11, from the automobile wheel.

The locking member 13 has a substantially tubular shape with substantially circular inner and outer cross sections. A central rib 24 divides the locking member into two equal halves, the central rib extending from one end face of the locking member to the other. A collar 25 is formed on one end face of the locking member. The outer diameter of the collar is sufficiently smaller than the inside diameter of the aperture 26 of the center cap that the collar may be received thereinto. Four snap fittings 27 are formed as part of the collar, and are adapted so as to engage with the rim of the aperture 26 when the locking member 13 is seated thereagainst. The catches thereby ensure that the locking member remains correctly seated during locking and unlocking movements, and prevents accidental or inadvertent dislodgment of the locking member when in an unlock position.

Figure 4:
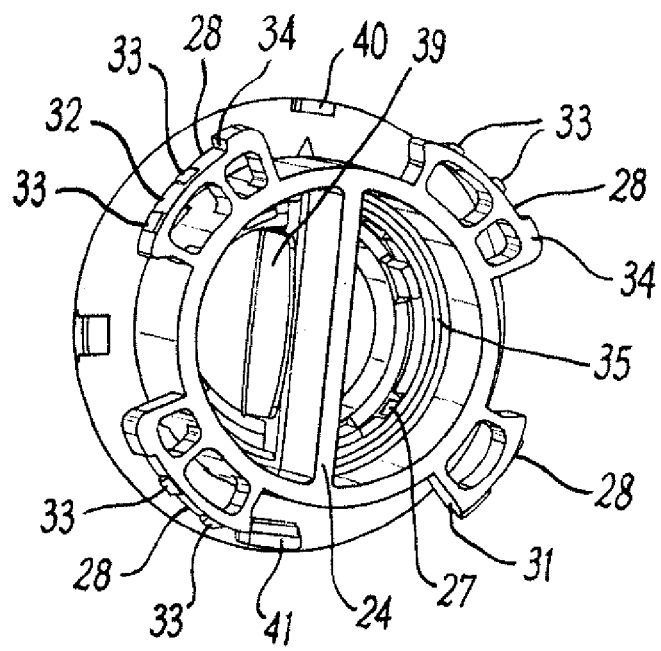
FIG. 4 is a reverse perspective view of the cap badge and the locking member of FIGS. 1 and 2 in an assembled state.

Referring now to FIG. 4, four projecting portions 28 are formed on the outside surface of the locking member at the opposite end of the locking member to the collar, each of these portions extending radially outwards from the locking member 13. The projecting portions are dimensioned and placed in a configuration so as to engage with the four resilient catches 20 of the center cap 12 when the locking element 13 is correctly fitted to the center cap and in a lock position.

One of the projecting portions 28 is narrower than the remaining three projecting portions. To fit the locking member 13 to the center cap 12, the locking member is rotated so that the narrowest projecting portion 28 is received between the projection 29 and the resilient catch 20 furthest from that projection. When the locking member is inserted correctly and turned in an unlock direction, the rear face 31 of the narrowest projection portion 28 will come into contact with stop 30. When a user performs the unlock operation, the rotation of the locking member 13 will be arrested when the rear face 31 comes into contact with the stop 30, thus indicating to the user that the locking member is in the unlock position. This facilitates the quick and safe operation of the assembly, even under potentially adverse conditions like low visibility or darkness.

Each projection has a radially outside surface 32 upon which is formed a number of ridge portions 33. Each of the ridge portions are positioned and dimensioned so as to be received into the grooves 23 provided on the four catches of the center cap when the locking member is correctly seated and in a locked position. Each projection portion has also formed a stop 34 on the outside surface thereof. When turned towards a lock position, each stop will come into contact with the corresponding resilient catch 20 and the locking member unable to turn further. This provides a clear indication to the user that the locking member is now fully in a lock position.

The inside surface of the locking member has a shoulder 35 formed thereon, towards the first end where the collar 25 is formed. The shoulder extends circumferentially around the inner surface of the locking member, and divides the inner surface longitudinally into two portions. The portion closer to the collar has a smaller inside diameter than the portion closer to the opposite end of the locking member. This shoulder is intended to cooperate with the snap fittings formed on the rear face of the cap badge 36 when the cap badge is correctly fitted to the locking member, as will be explained in further detail subsequently The cap badge 36 has a front face which faces away from the automobile wheel 10 when the cap badge is fitted to the center cap 12. The front face is accordingly visible when fitted and may therefore carry decorative material which may, in conjunction with any decorative material on the front face of the center cap, act to create a distinctive visual impression.

Figure 5A:
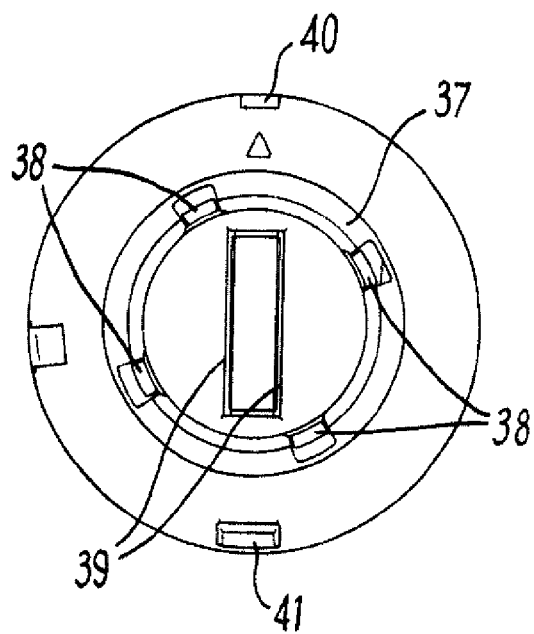
Figure 5B:
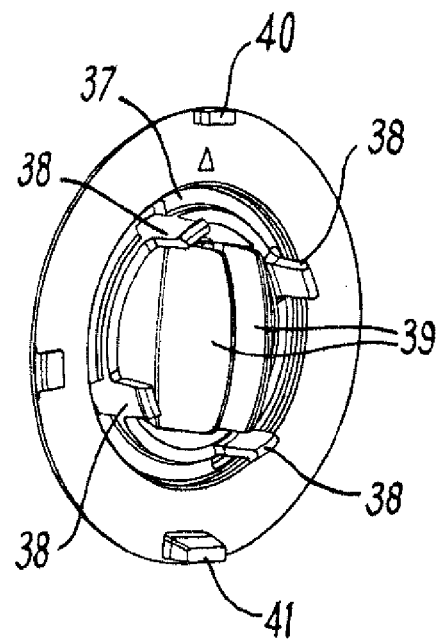

Referring to FIGS. 5a-b, the cap badge 36 has a rear face, which is substantially flat. A ring shaped recess 37 is formed on the rear face and concentrically therewith. The recess has an inner diameter sufficiently smaller than the diameter of the collar 25 provided on the locking member 13 for ensuring a close fit therebetween when the cap badge 36 is fitted to the locking member. Along the inner edge of the ring shaped recess and arranged in a circular configuration, four snap fittings 38 extend in an axial direction from the cap badge. The snap fittings are intended to engage with the shoulder 35 formed on the inner surface of the locking member when the cap badge is in a correctly and completely fitted position, so as to secure the cap badge thereagainst.

Two parallel lip portions 39 are positioned centrally on the rear face of the cap badge. The lip portions are intended to engage with opposite sides respectively of the central rib 24 of the locking element 13. Accordingly, the lip portions are positioned at a relative distance so as to afford a close fit with the central rib, but so as not to substantially impact or hinder insertion or retrieval operations.

Two tabs 40, 41 are formed on the rear face of the center cap, intended for insertion into the slots 19 formed in the center cap 12. The tabs are formed on opposed edges of the rear face of the cap badge and are aligned longitudinally with the lip portions. The tabs are have a substantially rectangular cross sections of different widths, dimensioned so as to fit into the slots on the center cap. The wider of the two tabs is too wide to be received into the smaller of the slots 19 in the center cap 12.

When the cap badge is fitted to the locking member 13, the lip portions 39 are in engagement with the central rib 24 of the locking member 13 (as shown in FIG. 4), and the oppositely arranged tabs 40, 41 are in engagement with the slots 19 of the center cap 12. The cap badge thereby prevents the locking member from rotating relatively to the center cap and hence providing a safeguard against accidental unlocking of the locking member.

Figure 6A:
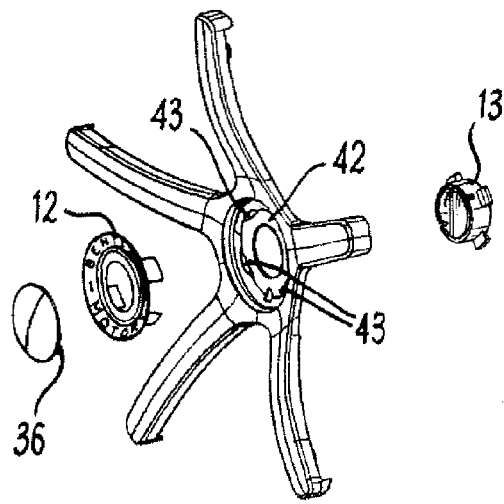
Figure 6B:
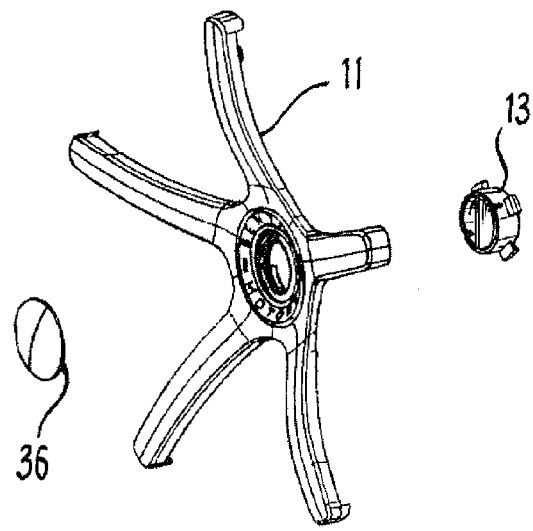
Figure 6C:
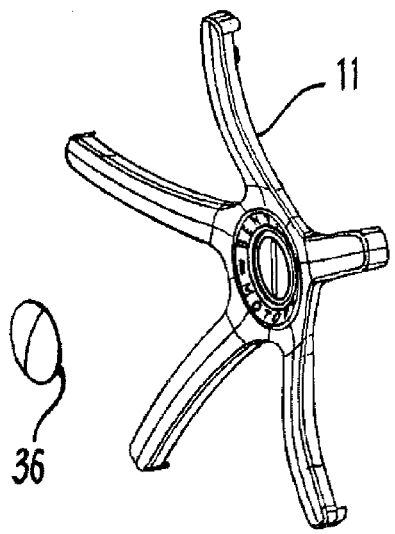

Referring to FIGS. 6a-c, a method of fitting the assembly will now be described. The center cap 12 is seated in the recess 42 of the trim component 11, the resilient catches 20 being inserted through corresponding apertures 43 formed in the recess. The locking member 13 is then fitted to the rear face of the center cap 12, the snap fittings 27 formed on the collar 25 of the locking element 13 engaging with the rim of the aperture 26 of the center cap. The assembly may then be fitted to the automobile wheel (not shown in FIG. 6, but shown in FIG. 1). The center cap 12 is received into the aperture 14 of the wheel 10, and the wedge shaped projections 21 on the catches 20 are received into the slot 14a of the wheel aperture with a snap fit, retaining the locking member 13 and the trim component 11 relative to the wheel. Once the assembly is correctly fitted to the wheel, the locking member 13 is turned in a lock direction. The four projecting portions 28 of the locking member engage with the four resilient catches 20 formed on the center cap 12, by way of the outside surface 32 of the projecting portions engaging with the inside surface of the catches. This locks the resilient catches and prevents them from moving radially inwardly and out of engagement with the slot 14a, and thereby accidentally or prematurely disengaging the assembly from the automobile wheel.

In addition to the tactile feedback provided by the cooperation between the resilient catches 20 and the stops 34, the user may verify that the locking member is in a lock position by checking that the central rib of the locking member is aligned with the slots formed in the center cap. Other indicators, such as arrows or the like, may be formed on or affixed to either or both of the locking member or the center cap to further aid the user verifying a lock position.

The cap badge 36 is then fitted to the assembly, the lip portions 39 of the cap badge engaging with the central rib 24 of the locking member, and the tabs 40, 41 being inserted into the slots 19 of the center cap. This prevents the locking member from rotating relative to the center cap, thereby preventing accidental detachment of the assembly from the automobile wheel. The cap badge 36 cannot be fitted unless the locking member is in the lock position, as the central rib 24 of the locking member 13 will otherwise not be in alignment with slots 19 of the center cap 12. As one of the tabs 40, 41 is too wide to be received into one of the slots 19, the badge can only be fitted in one orientation relative to the center cap 12.

It will be obvious to a skilled person that the embodiment of the invention described in the preceding has several advantages over the prior art.

A first advantage is a reduced risk of a trim component accidentally or prematurely dislodging from an automobile wheel, whether the automobile is moving or is stationary, through the use of the locking member and cap badge to prevent relative movement between the various components.

A further advantage of the present invention is that less force is required during mount and removal operations than for similar prior art devices. Whilst prior art devices rely purely on the material properties, and thus require a certain amount of brute force to use, the assembly of the present invention can be fitted and removed without the use of excessive amounts of force.

A third advantage of the present invention is the tactile feedback provided by the assembly whilst in operation. Accordingly, the assembly may be fitted and removed even under low visibility or other adverse conditions.

An alternative embodiment of the center cap and locking member is shown in FIG. 7. In this embodiment the outside surface 32 of each of the projecting portions 28 of the locking member 13 has a lead-in portion 50 and a lead-out portion 51. The outside surface 32 further has an over-center portion 52 and a stop notch 34.

The lead-in portion 50 is adjacent to leading edge 53 of the projecting portion 28 in a lock direction. The over-center portion 52 is adjacent to the lead-in portion 50 on one side, and adjacent to the lead-out portion 51 on the opposite side. The lead-out portion 51 is adjacent to the stop notch 34 on an opposite side to said over-center portion 52.

The radius $R_{LE}$ from the center of the locking member 13 to the leading edge 53 is smaller than the radius $R_C$ from the inner surface 54 of each of the catches 20 to the center of the center cap 12. The radius $R_{OC}$ between the center of the locking member 13 to the over-center portion 52 is larger than the radius $R_C$, thereby providing an interference. Accordingly the lead-in portion 50 slopes radially outwards from the leading edge 53 to the over-center portion 52. Similarly the radius $R_{SN}$ at the join between the lead-out portion 51 and the stop notch 34 is smaller than the radius $R_C$. The lead-out portion 51 slopes radially inwards from the over-center portion 52 to the join between the lead-out portion 51 and the stop notch 34.

When the locking member 13 is turned in a lock direction from an unlock position, the lead-in portion 50 will coact with the resilient catch 20 to urge the locking member 13 away from a lock position, i.e. the user will feel a resistance against the movement, until it reaches the over-center position 52. If the rotation in the lock direction is continued, the lead-out portion 51 will coact with the resilient catch 20 to urge the locking member 13 towards a lock position.

FIG. 8 shows the locking member 13 in a lock position. In the lock position, the stop notch 34 abuts the resilient catch 20, so as to retain the locking member 13 securely against the catch 20. The stop notch is adapted so as to conform with the shape of the resilient catch.

To unlock the locking member 13, a user may rotate the locking member in an unlock direction. The lead-out portion 51 coacts with inner surface 54 of resilient catch 20 to urge the locking member 13 towards the stop notch 34. The user will feel a resistance to the unlock movement until the over-center position 52 is reached. If the user now continues the rotation of the locking member, the lead-in portion 50 will coact with the inner surface 54 of the resilient catch 20 to urge the locking member towards an unlock position.

The above embodiments are described by way of example only. Many variations of the above embodiment is possible without departing from the scope of the invention as defined by the appended claims.

The invention claimed is:

1. An assembly comprising:
   a trim component intended to be mounted directly or indirectly on the wheel of a vehicle, the trim component having at least one resilient catch and intended to be mounted on, and retained relative to the wheel by way of the at least one resilient catch;
   a locking member rotatably mountable on the trim component and rotationally operable between unlocked and locked positions and arranged such that when in the locked position it prevents movement of the at least one resilient catch, and thereby prevents the assembly from being separated from the wheel; and
   a second locking member which is releasably attachable to the assembly, and arranged such that when it is attached to the assembly it retains the locking member in a locked position.

2. The assembly according to claim 1, wherein the locking member comprises engagement means for engagement with the at least one resilient catch to prevent movement of said at least one resilient catch.

3. The assembly according to claim 2, wherein the engagement means comprises at least one radial projection on an outside surface of the locking member.

4. The assembly according to claim 2, wherein the engagement means comprises at least one engageable formation.

5. The assembly according to claim 4, wherein said engageable formation comprises at least one ridge portion.

6. The assembly according to claim 4, wherein the resilient catch comprises at least one cooperating formation arranged to engage with said engageable formation when said locking member is in a substantially locked position.

7. The assembly according to claim 6, wherein said cooperating formation comprises at least one groove.

8. The assembly according to claim 7, wherein the at least one groove extends in a direction substantially parallel to the direction of the locking/unlocking movement.

9. The assembly according to claim 1, wherein said second locking member comprises first engagement means for engaging with the locking member.

10. The assembly according to claim 9, wherein said locking member comprises cooperating means for engaging with said first engagement means.

11. The assembly according to claim 9, wherein said first engagement means comprise at least one of a resilient catch or a lip portion.

12. The assembly according to claim 1, wherein said second locking member comprises second engagement means for engaging with the trim component so as to prevent an unlocking movement of said locking member.

13. The assembly according to claim 12, wherein said second engagement means comprises one or several projections extending substantially axially from a surface of said second locking member intended to be received into reception means of said trim component so as to prevent an unlocking movement of said locking member.

14. The assembly according to claim 13, wherein said reception means comprises one or several apertures arranged in a surface of said trim component.

15. The assembly according to claim 1, wherein the trim component is a center cap for a vehicle wheel, and the second locking member is a cap badge.

16. An assembly comprising:
a trim component intended to be mounted directly or indirectly on the wheel of a vehicle, the trim component having at least one resilient catch and intended to be mounted on, and retained relative to the wheel by way of the at least one resilient catch;
a locking member operable between unlocked and locked positions and arranged such that when in the locked position it prevents movement of the at least one resilient catch, and thereby prevents the assembly from being separated from the wheel; and
a second locking member which is releasably attachable to the assembly, and arranged such that when it is attached to the assembly it retains the locking member in a locked position;
wherein an interference locking arrangement is provided on the assembly between a surface of the trim component and a corresponding surface of the locking member.

17. The assembly according to claim 16, wherein the interference locking arrangement comprises a lead-in portion and a lead-out portion provided on a surface on one of either said component or said locking member.

18. The assembly according to claim 17, wherein said lead-in and lead-out portions form a continuous shape.

19. The assembly according to claim 17, wherein said lead-in and lead-out portions coact with a corresponding surface on the other one of either said component or said locking member to urge the locking member away from or towards a locked position, dependent on the position of the locking member.

20. The assembly according to claim 19, wherein said lead-in and lead-out portions are provided on a surface of said locking member.

21. The assembly according to claim 16, wherein the interference locking arrangement comprises a stop.

22. The assembly according to claim 21, wherein the stop is provided on the locking member.

23. The assembly according to claim 21, wherein the stop is a notch.

24. An assembly comprising:
a wheel;
a center cap intended to be mounted directly or indirectly on the wheel, the center cap having at least one resilient catch and intended to be mounted on, and retained relative to the wheel by way of the at least one resilient catch; and
a locking member rotatably mountable on the center cap and rotationally operable between unlocked and locked positions and arranged such that when in the locked position it prevents movement of the at least one resilient catch, and thereby prevents the center cap from being separated from the wheel; and
a cap badge which is releasably attachable to the center cap, and arranged such that when it is attached to the center cap it retains the locking member in a locked position.

* * * * *